United States Patent [19]

Nagata et al.

[11] Patent Number: 4,844,757
[45] Date of Patent: Jul. 4, 1989

[54] PROCESS OF FORMING ORNAMENTAL JOINTS

[75] Inventors: Hideyuki Nagata, Kawagoe; Susumu Kidokoro, Tokyo; Masao Morota, Hatogaya; Eiichi Tajima, Tokyo, all of Japan

[73] Assignee: Tajima Oyo Kako Kabushiki Kaisha, Tokyo, Japan

[21] Appl. No.: 644,799

[22] Filed: Aug. 27, 1984

[30] Foreign Application Priority Data

Mar. 1, 1983 [JP] Japan ................. 58-33138

[51] Int. Cl.$^4$ ............................................. B32B 31/00
[52] U.S. Cl. .................................. 156/62; 33/755; 52/105; 52/746; 144/352; 156/64; 156/71; 156/248; 156/268; 156/305
[58] Field of Search ............... 156/248, 64, 268, 71, 156/305, 62; 52/105, 746; 33/137 R; 144/352

[56] References Cited

U.S. PATENT DOCUMENTS

| | | | |
|---|---|---|---|
| 1,897,458 | 2/1933 | Whitney | 156/268 |
| 2,018,712 | 10/1935 | Elmendorf | 156/305 |
| 4,367,590 | 1/1983 | Winter et al. | 33/137 R |

Primary Examiner—John J. Gallagher
Attorney, Agent, or Firm—Felfe & Lynch

[57] ABSTRACT

This process of forming ornamental joints comprises sticking a sheet flooring material onto a floor base, thereafter drawing two parallel standard lines on this stuck sheet flooring material with a desired outline and an interval corresponding to the width of the joint, sliding a cutter on the sheet flooring material along this standard line thereby to draw two parallel cuts on this flooring material, stripping the sheet flooring material between these cuts to thereby form a joint-forming grooved portion provided with a masking along side edges of stuck sheet flooring material and charging this grooved portion with a joint material. This process permits to obtain various patterned ornamental joints.

5 Claims, 5 Drawing Sheets

PROCESS OF FORMING ORNAMENTAL JOINTS

BACKGROUND OF THE INVENTION

This invention relates to a process of forming ornamental joints on a sheet flooring material stuck to a floor base.

Part of the floor surface with the hitherto known ornamental joints is shown in FIG. 1, wherein reference numeral 1 denotes a flooring material comprising square tiles (regular square tiles in the drawing) and an ornamental joint 2 are formed between these flooring materials.

The processes of forming aforesaid joints 2 are partly shown in FIG. 2A, FIG. 2B and FIG. 2C. Explanation will be made thereon.

In these figures, reference numeral 3 denotes a floor base. On the surface of said floor base there are depicted standard lines 4 and 5 for use in laminating the flooring material, said standard lines comprising vertical and horizontal lines which form plural square sections 6, said square section having a width whose length is the total of the width L of the flooring material 1 and the width L' of the joint 2, and then on the surface of the standard lines there is applied transparent adhesive.

In succession, the flooring material 1 is put on the surface of the adhesive 7 and the upper portion of the section 6 so that crossing two sides 8 and 9 of the flooring material 1 may coincide with standard lines 4 and 5 respectively, and is stuck. Next, spacers 12 and 13 having the width L' are disposed in a space on the surface of the adhesive 7 formed between the other crossing two sides of the thus stuck flooring material 1 and the standard lines 4 and 5 (FIG. 2A and 2B).

Thereafter, the same procedure as this is repeated successively, and before the spacers 12 and 13 are fixed by the adhesive, the spacers 12 and 13 are stripped off to thereby form a joint-forming grooved portion between the respective flooring materials 1. Then, masking tapes 15 are arranged along both side edges of this material 1, so as to adhere to the surface of the flooring material 1, the grooved portion is charged with a joint material 14 (FIG. 2C), and thereafter the masking tape 15 is stripped, thereby obtaining a floor surface as shown in FIG. 1.

By providing the ornamental joint 2 like this, there is caused possibility of finishing the floor surface in the mode of marble or brick and obtaining the floor surface with an utterly different sense even when using the same flooring material. Therefore, the provision of ornamental joints is advantageous in achieving extremely superior design effects.

However, the conventional process of forming the above mentioned floor surfaces include various drawbacks as shown below:

(1) Since the flooring material 1 used therein is a square tile whose vertical and horizontal dimensions are uniform, the ornamental joint patterns are limited to specific ones and it is difficult to form complicated joint patterns. In other words, in the case of intending to change ornamental joint patterns by changing the vertical and horizontal dimensions inherent in the flooring materials used, it is necessary to cut off or add part of the flooring materials. Due to this, the operation becomes complicated and takes a long time, further the external appearance of the flooring materials is spoiled because in addition to the ornamental joint there is formed an unnecessary joint at the added portion, (2) Next, the conventional process necessitates spacers 12 and 13 as described above. Further, it is required to prepare spacers having various dimensions well-fitting to the length and width of each ornamental joint. Therefore, it is not only expensive but also complicates the operation including selection-working of spacers and the like. Still further, since the adhesive attaches to the spacers when removed, it is necessary to remove the adhesive therefrom, and in addition since there is the possibility of this attached adhesive staining the flooring materials, it is necessary to pay close attention in order to prevent the occurrence of such trouble, and (3) Lastly, this process, as described above, uses fixed-formed and independently separated flooring materials, and so is unable to use a sheet flooring material which is indefinite-formed and independently non-separated.

SUMMARY OF THE INVENTION

Accordingly, it is an object of this invention to provide a process of forming ornamental joints which is capable of eliminating the above mentioned drawbacks inherent in the conventional process of forming ornamental joints, forming ornamental joints whose patterns are not limited to specific ones, dispensing with the complicated operations such as choice and use of spacers as seen in the conventional process and producing ornamental joints with complicated patterns easily and cheaply.

According to this invention, said object can be achieved by transporting a sheet of flooring material prepared in a factory to a floor base in a building location separated from the factory for sticking the sheet flooring material onto the floor base, and by sticking the sheet flooring material onto a floor base, thereafter drawing two parallel desirably outlined standard lines on said sheet flooring material, then forming two parallel cuts on the flooring material along said standard lines, stripping the sheet flooring material between these cuts to thereby form a joint-forming grooved portion provided with a masking along said edge side, and charging said grooved portion with a joint material. That is, as the flooring material used is a sheet flooring material, the pattern of the ornamental joint can be made refined without limiting to the specific patterns by virtue of selecting the standard lines drawn on the sheet flooring material, and furthermore for that purpose there are no such disadvantages as seen in the conventional process that there is the necessity of using a transparent adhesive which can see through the standard lines drawn on the floor base, there is the necessity of using spacers provided temporarily between the respective flooring materials and the like. The width of the joint-forming grooved portion can be changed readily by adjusting the interval between drawn standard lines previously to a desired distance.

It is another object of this invention to provide a process of forming ornamental joints which is capable of providing a masking more easily and accurately than usual on a flooring material along both side edges of said stuck sheet flooring material when charging a joint-forming grooved portion with a joint material.

According to this invention, said object can be achieved by providing one embodiment of this invention which comprises sticking a tape like material covering the surface of standard lines drawn on a sheet flooring material, said tape like material being transparent and wider than the joint-forming grooved portion, drawing one other standard line, on the surface of this tape like material, which is parallel with said standard lines and can be seen through this tape like material, forming cuts on the tape like material and the sheet flooring material along these standard lines, stripping the sheet flooring material between these cuts and the tape like material stuck onto its surface to thereby form a joint-forming grooved portion, and forming a masking by said tape like material remaining on its both side edges. That is, this embodiment makes it possible to dispense with the 2-stage operation, as seen in the usual masking operation, which consists of the operation of forming the joint-forming grooved portion and the masking forming operation which comprises adhering two sheets of band like materials along both side edges of said sheet flooring material, providing the band like material with cuts at the same time when providing the cuts for use in the formation of the grooved portion, and thus forming masking at a single stroke when forming the grooved portion.

According to this invention, said object can be achieved by providing another embodiment of this invention which comprises using a tape like material which has a width wider than the joint-forming grooved portion and has two parallel standard lines printed on the surface, providing a guide line on the sheet flooring material at the position equal to the distance between a center line between the standard lines and one side end line of the tape like material when said tape like material has been adhered onto the sheet flooring material, arranging the tape like material on the sheet flooring material so that said one side end edge may be consistent with said guide line, and adhering the same.

The above mentioned two embodiments are advantageous in that both embodiments can achieve the aforesaid objects, and additionally the number of standard lines drawn on the sheet flooring material may be only one, which simplifies the line-drawing operation. Furthermore, since the standard line has previously been printed on the band like material in the case of the latter embodiment, there is no possibility of the width of the joint lacking uniformity or varying.

DETAILED DESCRIPTION OF THE INVENTION

Figure 1:
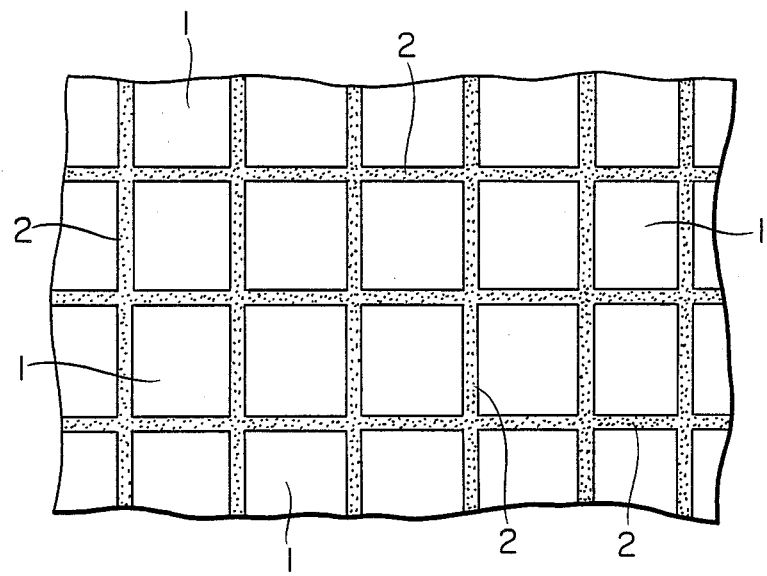
FIG. 1 is a partial plan view of the floor surface formed by the conventional process of forming ornamental joints.
Figure 2A:
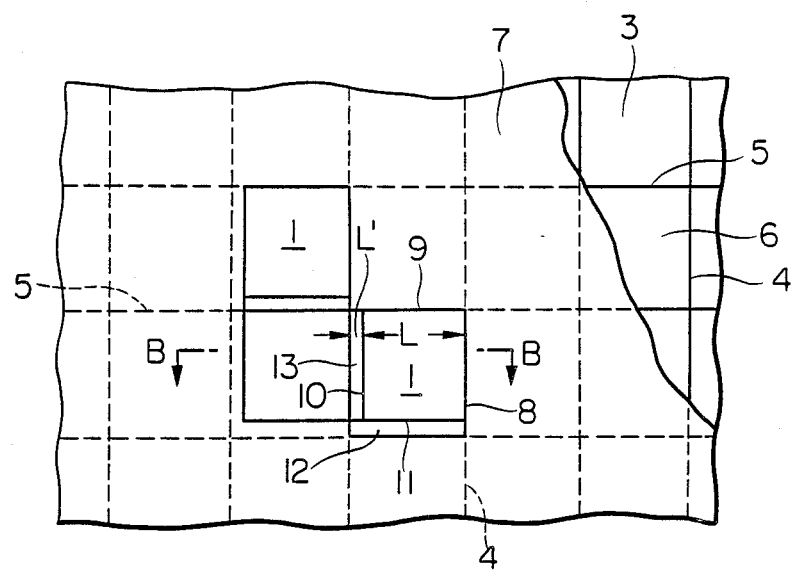
FIG. 2A is a partially cutaway plan view illustrating the outline of the conventional process of forming the floor surface shown in FIG. 1.
Figure 2B:
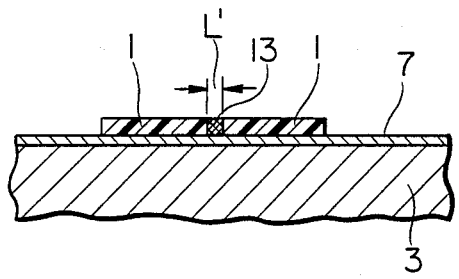
FIG. 2B is a sectional view taken in the direction of arrows along the line B—B of FIG. 2A.
Figure 2C:
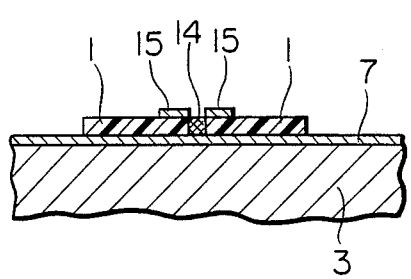
FIG. 2C is a sectional view illustrating the state of having charged the portion of FIG. 2B with a joint material.
Figure 3:
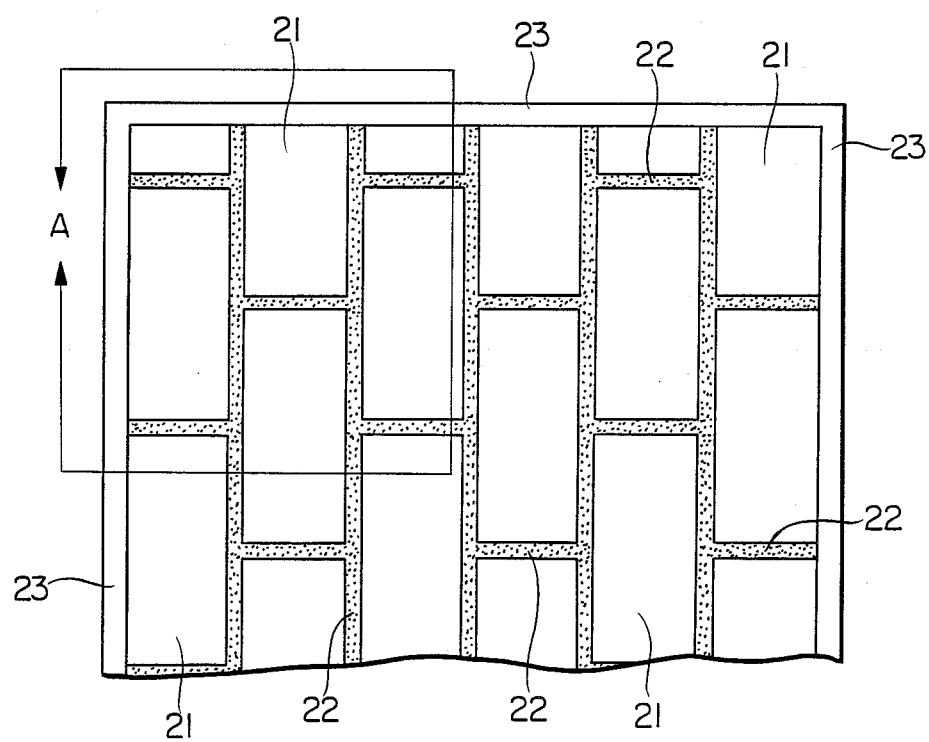
FIG. 3 is a plan view illustrating part of the floor surface formed by a process of forming ornamental joints according to this invention.

FIG. 3 partially shows the floor surface with ornamental joints formed using the forming process according to this invention, wherein reference numeral 21 denotes a flooring material adhered onto a floor base 23, and in the middle of these flooring materials 21 there are formed ornamental joints.

A process of forming the above mentioned ornamental joints 22 will be explained hereinafter with reference to embodiment shown in the drawings.

Figure 4:
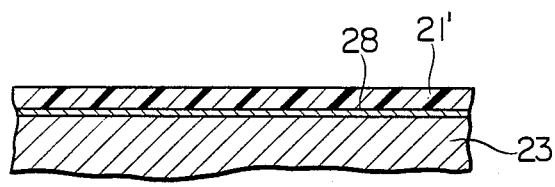
FIG. 4 is a partial sectional view illustrating the state of having stuck a sheet flooring material onto a floor base in forming the floor surface shown in FIG. 3.
Figure 5:
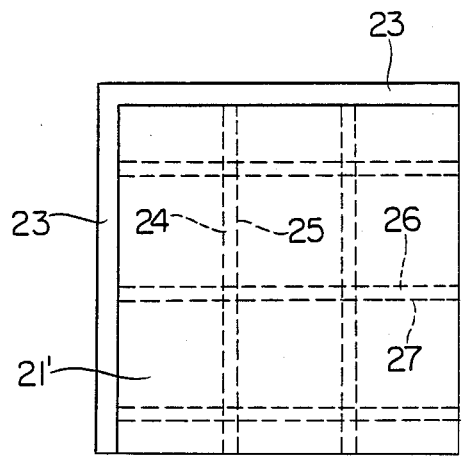
FIG. 5 is a plan view of A portion of FIG. 3 illustrating the state of having drawn standard lines on the surface of the floor shown in FIG. 4.

A sheet floor material 21' is stuck on the floor base 23 through an adhesive 28 (FIG. 4), and on its surface there are depicted, as shown with dotted lines, two parallel crosswise standard lines 24, 25 and 26, 27 by means of a suitable drawing means. Said crossing lines are designed to have a desired configuration and to have a width corresponding to that of the joint (FIG. 5).

Figure 6:
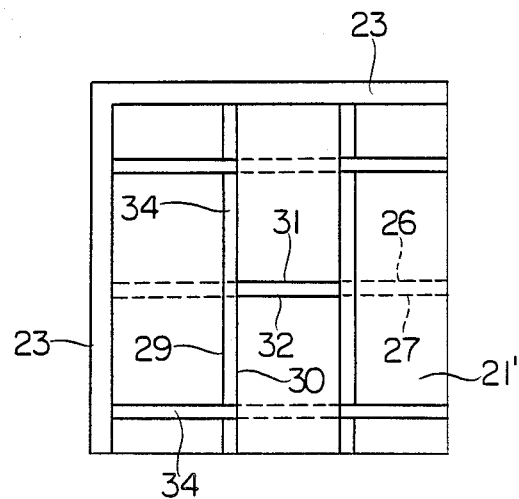
FIG. 6 is a plan view illustrating the state of having formed cuts on the surface shown in FIG. 5 by means of a cutter.
Figure 7A:
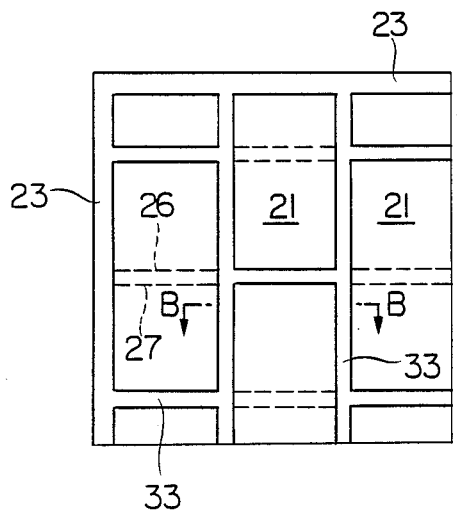
FIG. 7A is a plan view illustrating the state of having stripped the flooring material between cuts on the surface shown in FIG. 6.
Figure 7B:
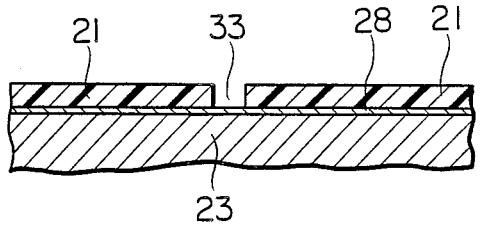
FIG. 7B is an enlarged sectional view taken in the direction of arrows along the line B—B of FIG. 7A.

Next, a desirable cutter (not shown) is used, and moved along the standard lines 24, 25 and 26, 27 to provide two parallel cuts 29, 30 and 31, 32 in the sheet flooring material 21' (FIG. 6), and thereafter the flooring material 34 between these cuts 29, 30 and 31 and 32 is stripped off to form a grooved portion 33 (FIG. 7A and FIG. 7B).

Figure 8:
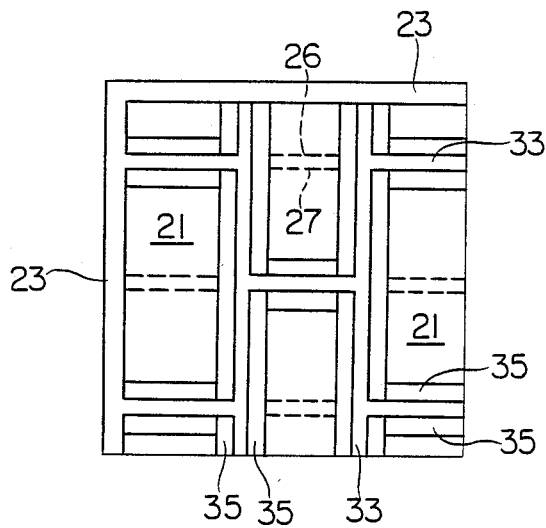
FIG. 8 is a plan view illustrating the state of having applied masking onto the floor surface shown in FIG. 7A.
Figure 9A:
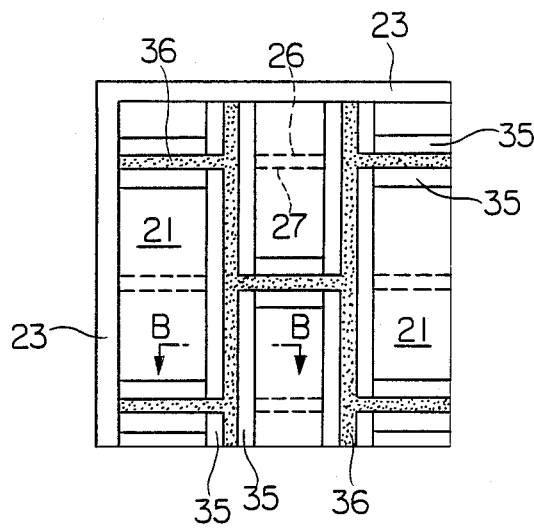
FIG. 9A is a plan view illustrating the state of having charged the floor surface shown in FIG. 8 with a joint material.
Figure 9B:
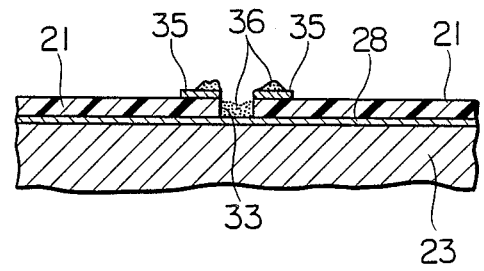
FIG. 9B is an enlarged sectional view cutaway along the line B—B and taken in the direction of arrows in FIG. 9A.

Then, this grooved portion 33 is charged with a joint material. In the practice of this charging, it is preferable that a tape like band is adhered along the side edges of the sheet flooring material 21 as shown in FIG. 8 to thereby provide masking 35 and charge a joint material 36 from between this masking 35 in the grooved portion 33 (FIG. 9A and FIG. 9B). By stripping the masking 35 off after that, there can be obtained the floor surface as shown in FIG. 3.

In the aforesaid case, it is possible to optionally select the pattern for the ornamental joint, but in many cases there are normally the marble-tone pattern and the brick-tone pattern. Its width is normally in the range of several mm -ten-odd mm, although the width differs depending on the pattern to be employed.

The purpose of providing a masking 35 is exactly the same as the purpose of the usual process. The masking 35 may be provided at any time, for instance, such as prior to the formation of the grooved portion 33, at the same time with the formation thereof or after the formation thereof.

For the purpose of providing the grooved portion 33 efficiently as well as accurately, however, it is preferable that masking is provided simultaneously with the formation of the grooved portion 33. In order to achieve said purpose, one embodiment of this invention is designed so that a tape like material (not shown) is stuck onto the surface of standard line 24, 25 and 26, 27 drawn on a sheet flooring material 21′, said tape like material being transparent and wider than the width of a grooved portion 33, cutter blades are slid on the surface of this tape like material along the perspective standard lines 24, 25 and 26, 27 to thereby form cuts; and then the sheet flooring material between cuts and the tape like materials stuck onto the surface thereof are stripped off thereby to form a grooved portion 33 with maskings 35. Generally speaking, in case the end edge of the masking 35 protrudes upwards of the grooved portion 33 without accurately matching the end edge of the grooved portion it is very difficult to charge a joint material, while in case the end edge of the masking 35 is deep-set than the end edge of the grooved portion the flooring material is stained by the joint material. According to the aforesaid embodiment, however, these disadvantages can be removed because both end edges are made to match each other without fail automatically as well as accurately. At that time, the position of the tape like material to be stuck may be not accurate.

Figure 10:
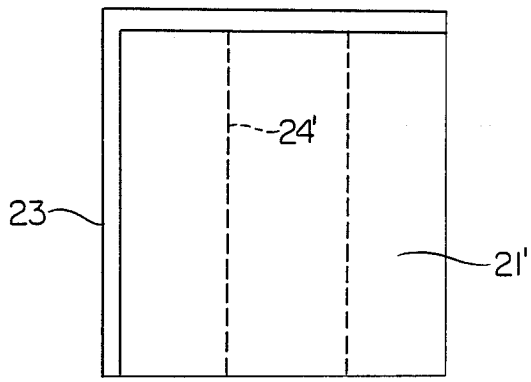
FIG. 10 is a plan view showing the state of drawing lines in another embodiment of the process of forming joints according to this invention.
Figure 11:
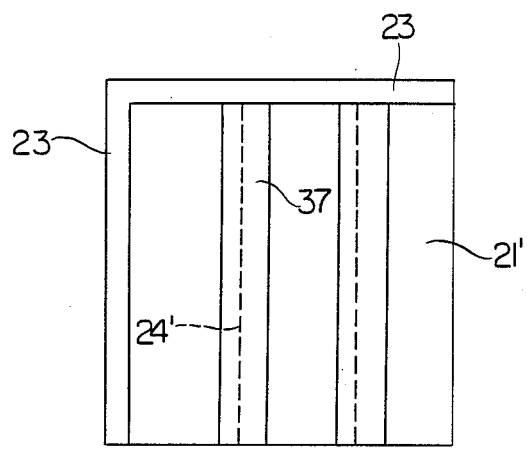
FIG. 11 is a plan view illustrating the state of having stuck a masking-forming tape like material onto the flooring material shown in FIG. 10.
Figure 12:
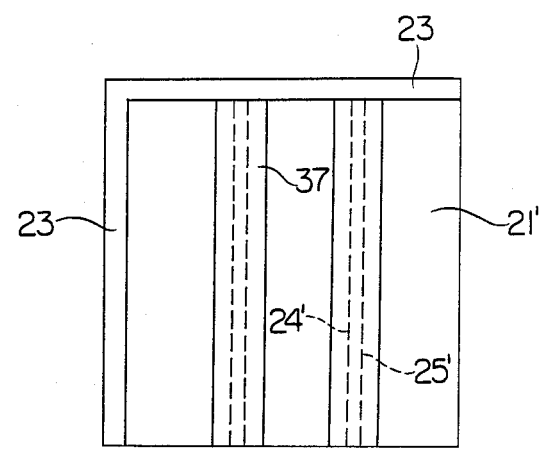
FIG. 12 is a plan view illustrating the state of having drawn lines on the tape like material, too.

The other embodiments using the same transparent tape like materials as that used in the aforesaid embodiment are illustrated in FIG. 10–FIG. 12. This embodiment is different from the aforesaid embodiment and can facilitate the operation of drawing standard lines on the flooring material 21′. This is because each pair of vertical and horizontal standard lines are replaced by one vertical standard line and one horizontal standard line. In FIG. 10, there is shown the vertical standard line 24′ along for the purpose of briefing explanation, said standard line 24′ comprising only one line. And, a tape like material 37 like that used in the aforesaid embodiment is stuck on the surface of this standard line 24′ (FIG. 11), another standard line 25′ is drawn on the surface of the tape like material 37, while seeing the standard line 24′ through the surface of this tape like material 37, so that the distance between this standard line 24′ and the standard line 25′ is equal to the joint width (FIG. 12), and the grooved portion and masking are formed by these both standard lines 24′ and 25′ according to the exactly same procedure. This embodiment has the same advantages as those of the aforesaid embodiment, and also has the advantage of simplifying said line-drawing operation.

Figure 13:
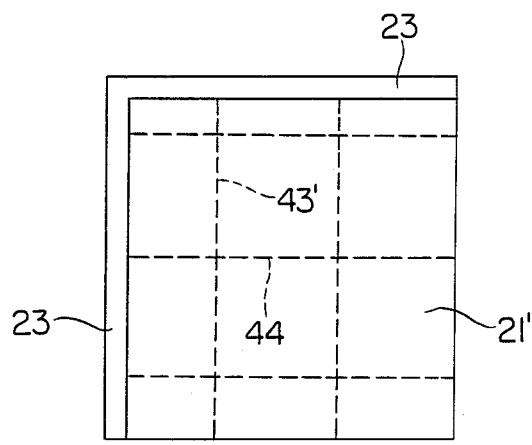
FIG. 13 is a plan view illustrating the time of drawing lines in the other embodiment of the process of forming joints according to this invention.
Figure 14:
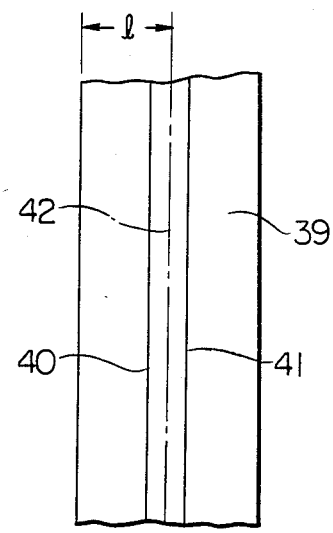
FIG. 14 is a plan view of the masking-forming tape like material used in the embodiment shown in FIG. 13.
Figure 15:
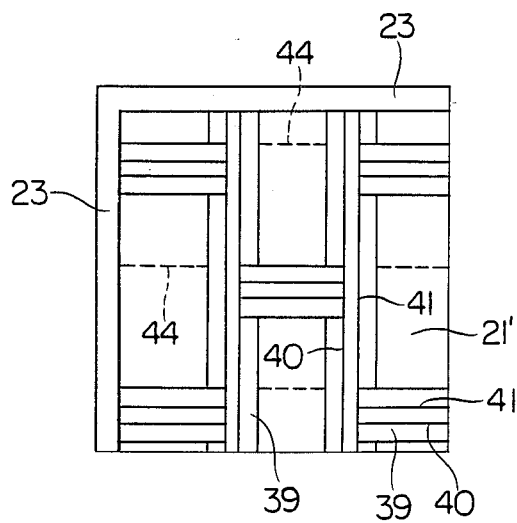
FIG. 15 is a plan view illustrating the state of having stuck the tape like material shown in FIG. 14 onto the flooring material shown in FIG. 13.

Next, explanation will be made on further another embodiment of this invention shown in FIG. 13–FIG. 15. This embodiment is identical with the aforesaid embodiment in that lines 43 and 44 drawn on the flooring material are each one in number, but is different therefrom in that this line serves not as a notched standard line but as a guide line for guiding a tape like material 39 (FIG. 14) and in addition the tape like material 39 is different from the tape like material 37 of the aforesaid embodiment in that the former has no necessity of being transparent and has, on its surface, two parallel standard lines 40 and 41 printed previously leaving the distance corresponding to the joint width. An end line on either side of the tape like material 39 is placed so as to agree with the guide lines 43 and 44 on the flooring material 21′ to thereby stick said tape like material 39 onto the flooring material 21′ (FIG. 15), and thus a grooved portion and a masking are formed by these both standard lines 40 and 41 according to the exactly same procedure as aforesaid. In this embodiment, attention must be paid to the fact that as the side edges of the tape like material 39 are placed in agreement with the guide lines 43 and 44, the center line of the joint, namely the center line 42 of the tape like material 39, displaces from the guide line 43 or 44 by the distance indicated l in FIG. 14. This embodiment, wherein the standard lines 40 and 41 have been printed, has the same advantages as the aforesaid embodiment, and further is advantageous in that as there is no possibility that the joint width is out of order or varies, the final external appearance is excellent.

This embodiment is profitable in that when suitable marks are provided for instance at the equidistant places on the guide line 44 along the longitudinal direction of the tape like material 39, there is nothing to do but merely drawing the guide line 43 on the flooring material 21′, whereby the drawing operation is facilitated more efficiently. That is, when the tape like material 39 is stuck longitudinally along the guide line 43 and the tape like materials 39 are stuck horizontally on the basis of marks on the surface of the former, the mutual distance of these horizontal tape like materials 39 becomes equal to the distance between marks, namely the distance between the guide lines 44, whereby the necessity of drawing the guide lines 44 is dispensed with and so the line-drawing operation is more facilitated.

The invention has been described in detail sufficient to enable one of ordinary skill in the art to make and use the same. It is believed that certain modifications and alterations of the preferred embodiment will occur to others upon a reading and understanding of the specification, and it is intended to include all such alterations and modifications as part of the invention, insofar as they come within the scope of the appended claims.

What is claimed is:

1. A method of forming ornamental joints comprising:
    transporting a sheet flooring material having a thickness and prepared in a factory to a floor base in a building location separated from the factory, sticking the sheet flooring material onto the floor base, making two desirably shaped parallel standard lines on the sheet flooring material, forming two parallel cuts on the flooring material stuck onto the floor base, the cuts reaching through the thickness of the sheet flooring material along the standard lines, stripping the sheet flooring material between the cuts to form a groove, sticking masking onto the surface of the flooring material along the edges of said groove, charging said groove with a filler, and thereafter stripping the masking for obtaining a floor surface.

2. A method of forming ornamental joints according to claim 1, in which the step of making said two standard lines comprises drawing said two standard lines directly on the sheet flooring material by means of a drawing means.

3. A method of forming ornamental joints according to claim 1, in which the steps of making two standard lines, forming two parallel cuts, stripping the sheet flooring material, sticking masking, charging said groove and stripping the masking comprise, respectively, drawing two pairs of two parallel standard lines on the sheet flooring material, forming two pairs of two parallel cuts on the flooring material stuck onto the floor base, the cuts reaching through the thickness of the sheet flooring material along the standard lines, stripping the sheet flooring material between the cuts to thereby form two grooves, sticking maskings onto the surface of the flooring material along the side edges of the grooves, charging the grooves with filler, and stripping the maskings for obtaining a floor surface.

4. A method of forming ornamental joints comprising:
   transporting a sheet flooring material having a thickness and prepared in a factory to a floor base in a building location separated from the factory; sticking the sheet flooring material onto the floor base;
   making two desirably shaped parallel standard lines on the sheet flooring material by drawing one of the standard lines directly on the sheet flooring material, sticking a tape-like material covering the surface of the standard line drawn on the sheet flooring material, the tape-like material being transparent and wider than a groove to be cut, and drawing another standard line on the surface of the tape-like material and parallel with the standard line seen through the tape-like material;
   forming two parallel cuts on the tape-like material and the sheet flooring material stuck onto the floor base, the cuts reaching through the thickness of the sheet flooring material along the standard lines;
   stripping the sheet flooring material between the cuts and the tape-like material stuck on its surface to thereby form a groove, the tape-like material forming a masking remaining on both side edges of the groove;
   charging the groove with a filler; and
   thereafter stripping the masking for obtaining a floor surface.

5. A method of forming ornamental joints comprising:
   transporting a sheet flooring material having a thickness and prepared in a factory to a floor base in a building location separated from the factory, sticking the sheet flooring material onto the floor base, preparing a tape-like material which is wider than a groove to be cut and has two parallel standard lines on the surface thereof, providing a guide line on the sheet flooring material at a position equal to the distance between the center line of the standard lines on the tape-like material and one side end edge of the tape-like material when the tape-like material has been adhered onto the sheet flooring material with said center line over the center line of a groove to be cut, arranging the tape-like material on the sheet flooring material so that said one side end edge is consistent with said guide line to thereby adhere the tape-like material to the sheet forming material, forming two parallel cuts in the tape-like material and the sheet flooring material stuck onto the floor base, the cuts reaching through the thickness of the sheet flooring material along the standard lines, stripping the sheet flooring material between the cuts and the tape-like material stuck onto the surface thereof to thereby form the groove, the tape-like material forming a masking remaining on both side edges of the groove, charging the groove with a filler; and thereafter stripping the masking for obtaining a floor surface.

* * * * *